(12) United States Patent
Rogers (10) Patent No.: US 8,634,681 B2
(45) Date of Patent: Jan. 21, 2014

(54) OPTICAL FIBRE CABLE FOR DISTRIBUTED FIBRE SENSING

(75) Inventor: Alan John Rogers, Surrey (GB)

(73) Assignee: Fotech Solutions Limited, London (GB)

( * ) Notice: Subject to any disclaimer, the term of this patent is extended or adjusted under 35 U.S.C. 154(b) by 28 days.

(21) Appl. No.: 13/375,596

(22) PCT Filed: May 26, 2010

(86) PCT No.: PCT/GB2010/001041
§ 371 (c)(1),
(2), (4) Date: Dec. 1, 2011

(87) PCT Pub. No.: WO2010/139934
PCT Pub. Date: Dec. 9, 2010

(65) Prior Publication Data
US 2012/0087619 A1    Apr. 12, 2012

(30) Foreign Application Priority Data
Jun. 2, 2009 (GB) .................................. 0909426.9

(51) Int. Cl.
*G02B 6/00* (2006.01)

(52) U.S. Cl.
USPC .......................................................... 385/13

(58) Field of Classification Search
USPC .................................... 385/12, 13
See application file for complete search history.

(56) References Cited

U.S. PATENT DOCUMENTS

| | | | |
|---|---|---|---|
| 4,443,700 A | 4/1984 | Macedo et al. | |
| 5,011,332 A | 4/1991 | Kunze et al. | |
| 5,091,983 A * | 2/1992 | Lukosz | 385/13 |
| 6,233,374 B1 * | 5/2001 | Ogle et al. | 385/13 |
| 2002/0154860 A1 * | 10/2002 | Fernald et al. | 385/37 |

FOREIGN PATENT DOCUMENTS

| | | |
|---|---|---|
| EP | 0178366 A2 | 4/1986 |
| EP | 0592114 A2 | 9/1993 |
| GB | 2414543 A | 11/2005 |
| JP | 60108807 | 6/1985 |

(Continued)

OTHER PUBLICATIONS

Koh et al., "Specialty Fibers for Discrete and Distributed Sensing Application," Proceedings of the SPIE, Smart Sensor Phenomena, Technology, Networks, and Systems 2009, 7293:729312-1-729312-8.

(Continued)

*Primary Examiner* — Mark A. Robinson
*Assistant Examiner* — Mary El Shammaa
(74) *Attorney, Agent, or Firm* — K&L Gates LLP (57) ABSTRACT

An optical fiber cable for distributed fiber sensing of fluid pressure is disclosed. There are also disclosed a method and an apparatus for distributed fiber sensing of fluid pressure using the optical fiber cable. The optical fiber cable is adapted for distributed pressure sensing, and comprises: one or more optical fibers (120); and a buffer (130) surrounding the one or more optical fibers and adapted to deform asymmetrically under isotropic pressure (P) such that the fiber experiences asymmetric strain changing the birefringence of the one or more optical fibers. The optical fibers incorporated in the cable may be conventional single mode optical fibers. The optical fiber cable may be used to determine a pressure distribution along the length of the cable. The cable, apparatus or method may be used to detect pressures over long distances such as in pipes, pipelines, or wells.

28 Claims, 5 Drawing Sheets

(56) References Cited

FOREIGN PATENT DOCUMENTS

| | | |
|---|---|---|
| JP | 61179403 | 8/1986 |
| JP | 62257037 | 11/1987 |
| JP | 63208809 | 8/1988 |
| WO | 2005/116601 A2 | 12/2005 |
| WO | 2006/096455 A1 | 9/2006 |

OTHER PUBLICATIONS

Written Opinion of the International Searching Authority for International Application No. PCT/GB/2010/001041, mailed Nov. 12, 2010, 12 pgs.

* cited by examiner

OPTICAL FIBRE CABLE FOR DISTRIBUTED FIBRE SENSING

CROSS REFERENCE TO RELATED APPLICATIONS

This application is a national phase application under 35 U.S.C. §371 of International Application No. PCT/GB2010/001041, filed on May 26, 2010, which claims priority to and the benefit of U.K. Patent Application No. 0909426.9, filed on Jun. 2, 2009, the entire disclosures of each of which are incorporated by reference herein.

TECHNICAL FIELD

The present invention relates to an optical fibre cable for use as a sensor cable for distributed detection of pressure in fluids. The present invention also relates to methods and apparatus for detecting fluid pressure using the optical fibre cable.

BACKGROUND ART

Distributed fibre optic sensing is a technique for determining information about an optical fibre or about the environment around the optical fibre. The technique consists of sending one or more optical pulses along an optical fibre and detecting light reflected or backscattered from the fibre. The related technique of optical time domain reflectometry (OTDR) is commonly used in telecommunications for verifying the performance of optical fibre. For example, breaks in the optical fibre will be a site of reflection for the optical pulse. By measuring the time taken for the reflection of the input pulse to be received at the input end of the fibre, the distance along the fibre of the break can be determined.

Distributed fibre optic sensing may use coherent or partially coherent pulses, or essentially incoherent pulses. The technique may be used to determine detailed information about the fibre or optical system such as the occurrence of high loss regions, highly scattering regions, or to monitor changes in the optical properties of the fibre material. For example, changes in refractive index can be monitored. If the environment around the optical fibre imparts changes in the optical properties of the fibre, then changes in the environment can also be monitored.

WO 2005/116601, which is incorporated herein by reference, describes a method and apparatus for detecting pressure distribution in fluids. The apparatus includes a light source for transmitting pulses of light along a single mode optical fibre. Pulses are preferably linearly polarised and successively incident at two polarizations 45° to each other such that information on changes in the birefringence can be obtained. The polarisation of light backscattered from the fibre is detected. Pressure in fluids is isotropic and hence the pressure on an optical fibre in a fluid will act isotropically on the fibre. Such isotropic stress will try to compress the fibre uniformly in all directions. Hence, changes in the optical properties of the fibre will tend to be uniform and small. To use an optical fibre to measure the pressure in a fluid; the isotropic pressure must be converted to an anisotropic or asymmetric deformation of the fibre which can be detected by changes in birefringence. One prior art embodiment uses a type of fibre known as side-hole fibre (SHF) which has air holes spaced either side of the core and parallel to the fibre axis. Such side-hole fibre deforms asymmetrically under the influence of an isotropic pressure e.g. in fluid. For example, the core will experience a greater compressive strain perpendicular to the holes than parallel to the plane of the holes. The asymmetric deformation imparts an asymmetric stress on the core of the optical fibre changing its birefringence proportionally to the pressure. The change in birefringence is detected by the polarisation state of the backscattered light.

Although the side-hole fibre is effective for measuring isotropic pressure in fluids, the side-hole fibre is difficult and expensive to manufacture.

The side-hole fibre also has a maximum pressure range which can be measured by the fibre. The range is determined by the construction of the fibre.

Furthermore, as the measurable pressure range for a given fibre design increases, the absolute sensitivity of the fibre to changes in pressure decreases because a fractional change in birefringence is caused by an equivalent fractional change in pressure. In other words, for fibres with maximum pressure ranges of 1 MPa (10 bar) and 100 MPa (1000 bar) respectively, a 1% change in birefringence might be caused by a 1% change in pressure. This equates to 0.1 bar and 10 bar for the two fibres respectively resulting in the fibre having the 100 MPa pressure range having a much lower absolute sensitivity than the 1 MPa fibre. Hence, it would be desirable to provide an optical fibre that can measure large ranges of pressure to high sensitivity.

SUMMARY OF THE INVENTION

The invention provides an optical fibre cable for distributed pressure sensing, such as when immersed in a fluid, the cable comprising: one or more optical fibres; and a buffer or casing surrounding the one or more optical fibres and adapted to deform asymmetrically under isotropic pressure, or changes in isotropic pressure, such that the fibre has or experiences asymmetric strain which changes the birefringence of the one or more optical fibres.

The buffer may be adapted to deform to exert a pressure asymmetrically on cores of the one or more optical fibres when an isotropic pressure acts on the cable to change or produce birefringence in the cores. The buffer preferably comprises one or more solid materials in contact with the cladding of at least one of the one or more optical fibres. The buffer extends radially from the cladding, in a continuous path, towards the fluid exerting the pressure to be detected. The buffer may be in contact with fluid such that pressure is transferred from the fluid to the fibre. If the buffer is enclosed in a jacket, the jacket may be in contact with the fluid. The buffer material may have asymmetric compressibility.

The fibre may be adapted to convert an isotropic pressure into an asymmetric strain by comprising a buffer which has an orthogonally asymmetric cross-section transverse to the longitudinal axes of the one or more optical fibres, and/or by comprising a buffer which has orthogonally asymmetric compressibility transverse to the longitudinal axes of the one or more optical fibres.

Planes of orthogonal asymmetry of the buffer may coincide with the fast and slow axes of the one or more optical fibres. Conventional single mode fibre has little circular asymmetry and hence the intrinsic difference between fast and slow axes for an unstressed fibre will be insignificant. This means that the alignment of the orthogonal features of the buffer to the fast and slow axes of the fibre may not be required.

The one or more optical fibres may be single mode fibres having a core and cladding, the core and cladding forming the light-guide.

The buffer material may be anisotropic such that it deforms different amounts in orthogonal directions under isotropic pressure and is arranged such that the one or more optical fibres experience asymmetric strain changing the birefringence of the one or more optical fibres.

The buffer surrounds the one or more optical fibres and may have a radial thickness which varies with orthogonal symmetry. The buffer may have one or more longitudinal regions of a first thickness and one or more longitudinal regions of a second thickness greater than the first thickness. These regions may be linear stripes or bands parallel to the fibre axis. The longitudinal regions of a first thickness may be arranged to deform more than the regions of a second thickness when an isotropic pressure is exerted on the cable.

The optical fibre cable may further comprise a pair of ribs arranged in the buffer on a diameter of the cable. The ribs may be less compressible than the buffer such that the fibre experiences asymmetric strain when the cable is under isotropic pressure.

The optical fibre cable may comprise a pair of side holes arranged in the buffer, for example, on a diameter of the cable. The side holes may run substantially along the length of the fibre or an element of the fibre, for example parallel to the core. The side holes may contain air or other gas such that they are more compressible than the buffer thereby causing the fibre to experience asymmetric strain when the cable is under isotropic pressure.

The optical fibre cable may comprise a plurality of optical fibres arranged linearly in the buffer.

The optical fibre cable may further comprise a jacket around the buffer.

The length of fibre cable may be determined by the length of the fluid path or conduit in which the fluid pressure is being measured. A fibre length of at least 100 m is likely and even 1000 m or more is possible. The invention also provides an apparatus for monitoring a pressure, or changes in pressure, along a fluid path, the apparatus comprising: the optical fibre cable described above; a light source arranged to launch optical pulses into the one or more optical fibres of the optical fibre cable; a detector for detecting light backscattered from within the one or more optical fibres of the optical fibre cable; and an analyser arranged to detect the pressure distribution, or changes in the pressure distribution, along a length of the fibre from the detected backscattered light from the one or more optical fibres based on strain induced changes in birefringence of at least one of the optical fibres. The detector may perform polarimetry on the detected backscattered light.

The fluid path may be a length of pipeline, an oil well, or other fluid carrying conduit, and the pressure distribution is the fluid pressure along part or all of the length of the path in which the fibre cable is present.

The detector may be polarisation detector arranged to detect the polarisation states of the backscattered light. The detector may also be a photodetector with a polariser in front, or may include two polarisers and detectors and a further light divider arranged such that each detector receives orthogonal polarisation states, or polarisation states separated by another angle, e.g. 45°.

The analyser may be arranged to detect or derive a spatial pressure distribution along the fibre from the detected polarisation states. The analyser may be arranged to detect the pressure as a function of the distance along the fibre from the detector from the round trip travel time of the backscattered optical pulse. The analyser may comprise a memory for storing birefringence calibration data for at least one of the optical fibres of the optical fibre cable at a first pressure. The memory may be arranged to store birefringence calibration data for at least one of the optical fibres of the optical fibre cable at a second pressure higher than the first, and the analyser may be arranged to interpolate to determine the pressure distribution in the fluid.

The light source may be arranged to launch partially coherent pulses. The light source may be arranged to launch linearly, circularly or elliptically polarised pulses.

The present invention further provides a distributed fibre optic sensing method for determining a pressure distribution, or changes in a pressure distribution, in a an extended fluid path, the method using the optical fibre cable described above as a sensor optical fibre cable, and comprising: launching optical pulses into one or more optical fibres of the sensor optical fibre cable; detecting light backscattered from the one or more optical fibres of the sensor optical fibre cable; and calculating a function of the pressure in the fluid, as a distribution along a length of the fibre cable, from the detected backscattered light from the one or more optical fibres.

The step of detecting may comprise detecting the polarisation states of the backscattered light and the intensity of light in those states.

The step of calculating may comprise deriving a spatial pressure distribution along the fibre from the detected polarisation states and/or their intensity.

The method may further comprise storing birefringence calibration data for at least one of the optical fibres of the optical fibre cable at a first pressure. The method may further comprise storing birefringence calibration data for at least one of the optical fibres of the optical fibre cable at a second pressure higher than the first; and interpolating to determine the sensed pressure distribution in the fluid.

The method may further comprise deploying the optical fibre cable described above in an extended environment, such as a pipeline or oil well.

The present invention also provides a method of detecting changes in the distribution of fluid pressure along an extended path, comprising: deploying an optical fibre cable along the path, the cable comprising a buffer and at least one optical fibre embedded within the buffer, the buffer being adapted to exert an asymmetrically changing force or strain on the optical fibre under changes in fluid pressure; launching optical pulses into the at least one optical fibre; collecting light backscattered within the fibre; and detecting said changes from polarisation properties of the collected light.

Fully distributed optical-fibre sensing is a technique for measuring the spatial distribution of any extended measurand field, using Rayleigh backscatter in an optical fibre. The external measurand impacts upon the fibre to alter, in some deterministic way, its properties. These properties are then interrogated by launching an optical pulse into the fibre, and monitoring the properties of light Rayleigh-backscattered by the pulse via small inhomogeneities and impurities in the fibre's glassy structure. The spatial distribution of the fibre's properties can be inferred from the temporal variation of this backscattered light, thus allowing the spatial distribution of the measurand field to be determined along the path of the optical fibre. Spatial resolutions of order 1 metre can be achieved, over measurement distances up to about 10 km.

A uni-directional force acting on the fibre transversely to its axis will strain and distort its core asymmetrically in the transverse plane. These effects will alter the optical polarization properties of the fibre; in particular, they can induce a linear birefringence in the fibre. Such birefringence is characterized by the possession of two transverse polarization axes. Light components which are linearly-polarized in the directions of these axes will travel with differing group velocities.

The birefringence will have a magnitude proportional to the applied force. The spatial distribution of this force can then be mapped by launching a polarized light pulse into the fibre, and by then measuring the temporal variation of the backscattered light's polarization state. Computation then allows the spatial distribution of the impacting force to be determined along the fibre length.

There is a particular problem with the measurement of the distribution of isotropic pressure, such as that which arises when the fibre is immersed in a fluid (gas or liquid). An isotropic pressure, clearly, can induce no asymmetric effects in the fibre core, and no birefringence. If the pressure distribution is to be measured in this case it is necessary to devise a method by which isotropic pressure does, indeed, induce an asymmetric effect in the fibre core.

One known method for doing this is to use an intrinsically-asymmetric fibre such as a side-hole fibre (SHF).

Another, which is the subject of this application, is to use an asymmetric cable structure.

Consider an elliptical optical fibre cross-section with multiple cores and an elliptical buffer surrounding the fibre. In this structure it is clear than an external, isotropic, fluid pressure will affect asymmetrically the various fibre cores, because they are all more effectively buffered from the pressure in one direction (e.g. horizontal) than another direction (e.g. vertical). Hence, the fluid pressure will now induce linear birefringence in the fibre cores, and the pressure distribution can then be measured via a distributed measurement of this birefringence.

Moreover, the magnitude of the birefringence will vary with the individual fibre's lateral position in the structure, thus allowing for a set of differing dynamic measurement ranges in the same cable.

The above described example is only one of a suitable asymmetric optical-fibre cable cross-section: others are possible. This application relates to any structure which allows an isotropic pressure to impact asymmetrically on an enclosed optical fibre, and thus to induce birefringence in its core.

The present invention provides a cable structure containing one or more optical fibres and possessing cross-sectional asymmetry such as to allow isotropic pressure acting on the outer cable surface to act asymmetrically on the contained fibre cores, so as to induce optical birefringence in the fibres. Fibre cable structures, obeying these criteria, may perform their action either through asymmetrical geometries, asymmetrical material structures or asymmetric intrinsic strain profiles. The present invention also provides for the incorporation of several fibres at different positions in the asymmetrical cable structure so as to provide a range of sensitivities of the birefringences to external pressure. The present invention further provides for the incorporation of several fibres at different positions in the asymmetrical cable structure so as to provide a variety of dynamic measurement ranges for the pressure measurement.

Distributed optical-fibre sensing (DPS) makes use of the Rayleigh-backscattered light from a polarized, optical pulse propagating in a monomode optical fibre. This returning light is polarization-analysed, and its temporal variation allows spatial mapping of the fibre's polarization properties as a function of axial position along the fibre.

In order to use this information to determine the spatial distribution of isotropic pressure in a fluid in which the fibre is immersed, the pressure must be allowed to impact on the fibre core asymmetrically in the plane normal to the fibre axis. In this case the fibre's polarization properties can be modified to an extent which is proportional to the fluid pressure. This can be done by enclosing standard optical fibre in a cable which possesses an asymmetrical cross-section.

BRIEF DESCRIPTION OF THE DRAWINGS

Embodiments of the present invention, along with aspects of the prior art, will now be described with reference to the accompanying drawings, of which.

DETAILED DESCRIPTION OF THE PREFERRED EMBODIMENTS

Figure 1:
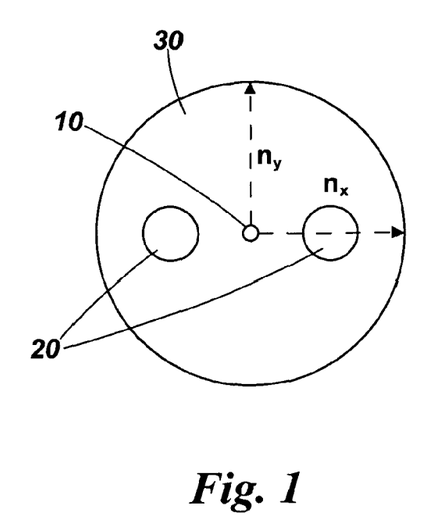
FIG. 1 is an illustration of a cross-section of conventional side-hole fibre.

FIG. 1 shows side-hole fibre discussed above in relation to the prior art. The side-hole fibre comprises a circular or elliptical core 10 with holes 20 located either side of the core. The core and side-holes are enclosed within cladding 30. In conventional single-mode fibre the core and cladding together provide waveguiding with most of the light being carried by the core, and a small portion being carried in the cladding. A conventional single mode optical fibre designed for use in the near infra-red may have a core diameter of 8 μm surrounded by a cladding of diameter 125 μm. The cladding may be surrounded by buffer of 250 μm diameter and protected by a jacket having a 400 μm diameter. The buffer and jacket are not involved in light guiding.

The holes 20 of the side-hole fibre are located in the cladding but are sufficiently far away from the core not to be directly involved in light guiding.

The side-hole fibre is linearly birefringent having a refractive index $n_x$ in the plane of the side holes 20 and refractive index $n_y$ in a plane orthogonal to the side holes 20. The birefringence b is therefore given by:

$$b = n_x - n_y$$

Figure 2:
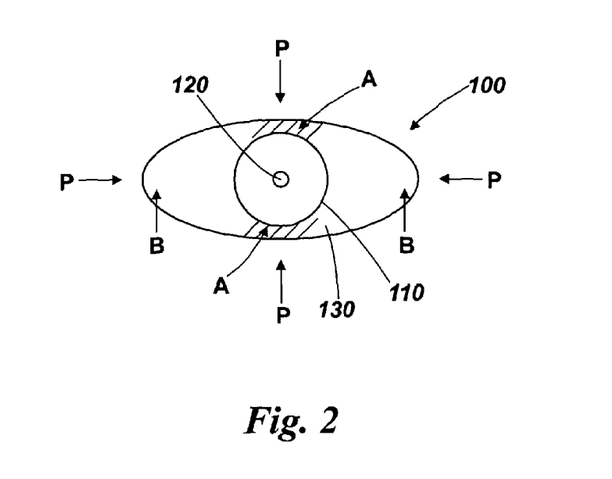
FIG. 2 is an illustration of a cross-section of an optical fibre cable embodiment including a single optical fibre.

FIG. 2 illustrates an optical fibre cable 100 according to an embodiment of the present invention. The fibre cable 100 shown comprises an optical fibre 110 having a core 120. The fibre is surrounded by buffer 130. The buffer 130 is an elliptical shape around the optical fibre. The optical fibre is a standard single mode optical fibre, such as SMF-28. The buffer is relatively much thinner at regions A at the minor axis of the ellipse compared to regions B at the major axes of the ellipse. The regions A allow a pressure P, which acts in all directions around the buffer 130, to exert a corresponding pressure on the optical fibre 110 because in this region the buffer is thin enough to flex relatively freely. Regions B, which also experience pressure P but are thicker than the regions A do not flex as readily and prevent the full magnitude of the pressure P from being exerted on the fibre in the major axis direction. As a result the fibre feels a pressure similar to P from above and below, and a pressure significantly less than P from the sides. The non-uniform pressure distribution on the fibre results the fibre core being under compression in the vertical direction inducing birefringence in the fibre. Since a standard optical fibre will normally have a small amount of birefringence due to slight ellipticity or stress in the core, the total birefringence is given by $$b=b_0+b_i$$

where $b_0$ is the intrinsic birefringence of the fibre and $b_i$ is the induced birefringence.

For some embodiments and types of fibre, such as those with high intrinsic birefringence, it may be advantageous to align the major and minor axes of such an elliptical buffer with the ordinary and extraordinary ray axes of the fibre core. However, generally for single mode fibre there will be little intrinsic birefringence between ordinary and extraordinary ray axes, and such an alignment will be unnecessary.

As mentioned above the optical fibre 110 may be a standard single mode optical fibre for use in the near infra-red. The buffer 130 may be a polymer coating which in the regions A is relatively thin and is able to flex a small amount to transfer the fluid pressure P to the optical fibre 110. In regions B the increased buffer thickness mean the buffer layer there is less flexible and hence the sides of the fibre at B are not subjected to the full pressure from the fluid.

Not shown in FIG. 2, the optical fibre cable may be enclosed in a protective jacket layer. The jacket should be flexible to allow the fluid pressure to be incident on the buffer 130.

Figure 3:
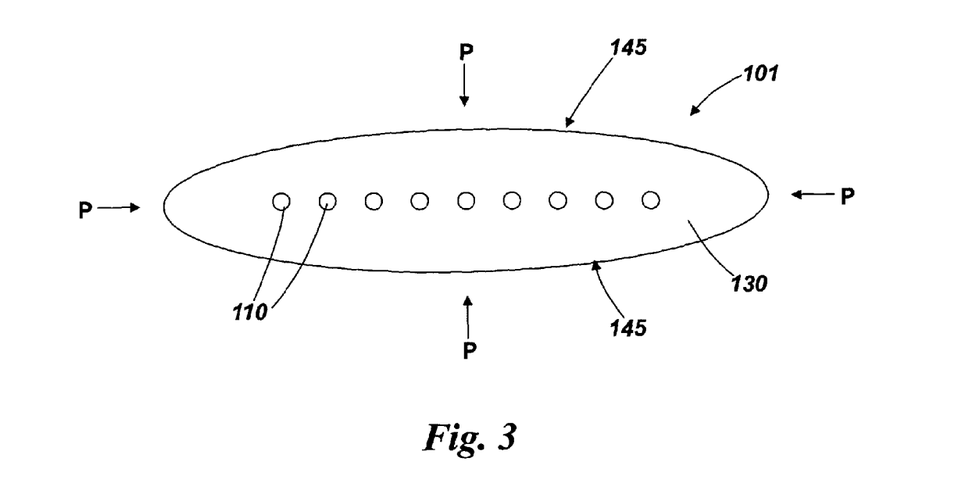
FIG. 3 is an illustration of a cross-section of an optical fibre cable embodiment including multiple optical fibres.

FIG. 3 shows an alternative embodiment in which a plurality of optical fibres 110 are incorporated in optical fibre cable 101. The plurality of optical fibres may be standard single mode optical fibres or may be a plurality of fibres in a ribbon. The plurality of optical fibres are arranged in a linear array. Similar to FIG. 2 the optical fibres are surrounded by buffer 130. Again the buffer 130 is significantly thicker in the horizontal direction than the vertical direction as shown in the figure. For example, the buffer may be up to five or ten times as thick even up to 100 times as thick in the horizontal direction compared to the vertical direction.

The rigidity of the buffer material results in the actual pressure experienced by the fibres 110 being reduced in the horizontal direction more than in the vertical direction as described above in relation to FIG. 2. As shown in FIG. 3, the cable cross-section is an elongated ellipse. The ellipse is so elongated that sides 145 are approximately parallel. In another embodiment the sides 145 are more curved. The outer shape of the buffer 130 will determine the fraction of the fluid pressure P exerted on each individual fibre.

Figure 4:
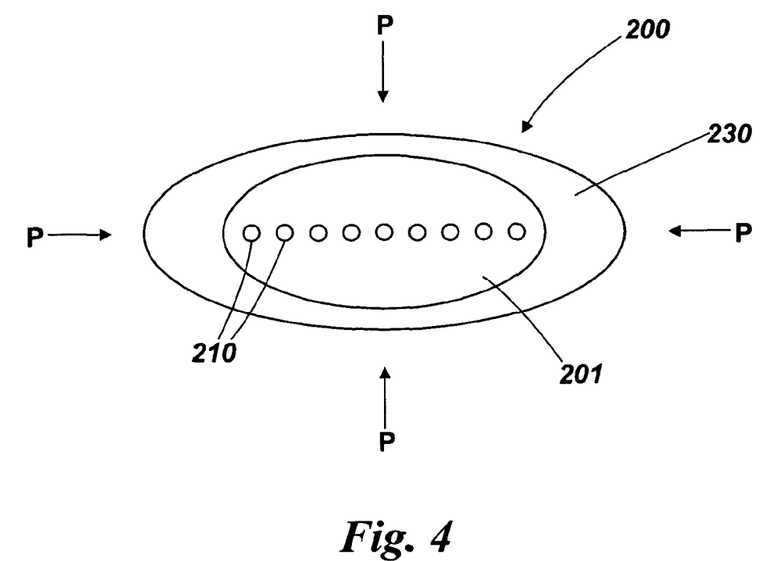
FIG. 4 is an illustration of a cross-section through an optical fibre cable embodiment which comprises an optical fibre having multiple cores.

FIG. 4 shows an alternative embodiment in which the optical fibre cable 200 comprises a fibre 201 having multiple cores 210 arranged in a line. The cores are preferably equally spaced. The cores 210 are supported by a common cladding 201 which has an elliptical or oval cross-section transverse to the fibre axes. The cores are spaced far enough apart to minimise any crosstalk between the fibres. The cladding 201 is surrounded by a buffer 230 which also has an elliptical or oval cross-section.

In the embodiments of FIGS. 3 and 4 each of the fibre cores will experience a different amount of stress or compression because of the differences in position in the cable. Hence, different levels of induced birefringence will arise. The different levels of birefringence mean that depending on the position of the core in the fibre cable, some fibres will be better suited to detecting certain pressure ranges and be more sensitive to certain pressure ranges.

Birefringence b can also be expressed as a beat length $L_b$. Beat length is defined as the length of fibre in which light propagating in orthogonal eigenmodes (the fast and slow axes in the case of pure linear birefringence) realises a $2\pi$ relative phase difference. The birefringence b is linked to the operating wavelength $\lambda$ by $$L_b=\lambda/b$$

To be able to use the backscatter signal to usefully detect the birefringence and hence pressure, the local beat length $L_b^{local}$ of the fibre should ideally be at least twice the spatial length of the light pulse used to interrogate the fibre. For a light pulse of duration T, this condition can be expressed as $$\frac{c}{n}T \le \frac{L_b^{local}}{2}$$

Where c is the speed of light and n is the isotropic refractive index of the fibre's core. This condition should hold across the range of pressures intended to be measured by that fibre core.

The different positions of the fibre cores within the fibre will mean the cores will have different local beat lengths when the fibre cable is under pressure. Hence, the different fibre cores will be suitable for measuring different pressure ranges. The range of pressures that can be measured may be further extended by launching optical pulses of different lengths down the different fibre cores. The method of interrogating the fibre cable will be described in more detail later.

The optical fibre cables of FIGS. 3 and 4 show nine fibre cores. Other numbers of fibres or cores can be used. For example, three, four or five may also be particularly appropriate, and as discussed above the cable may incorporate only a single fibre in some embodiments.

Figure 5:
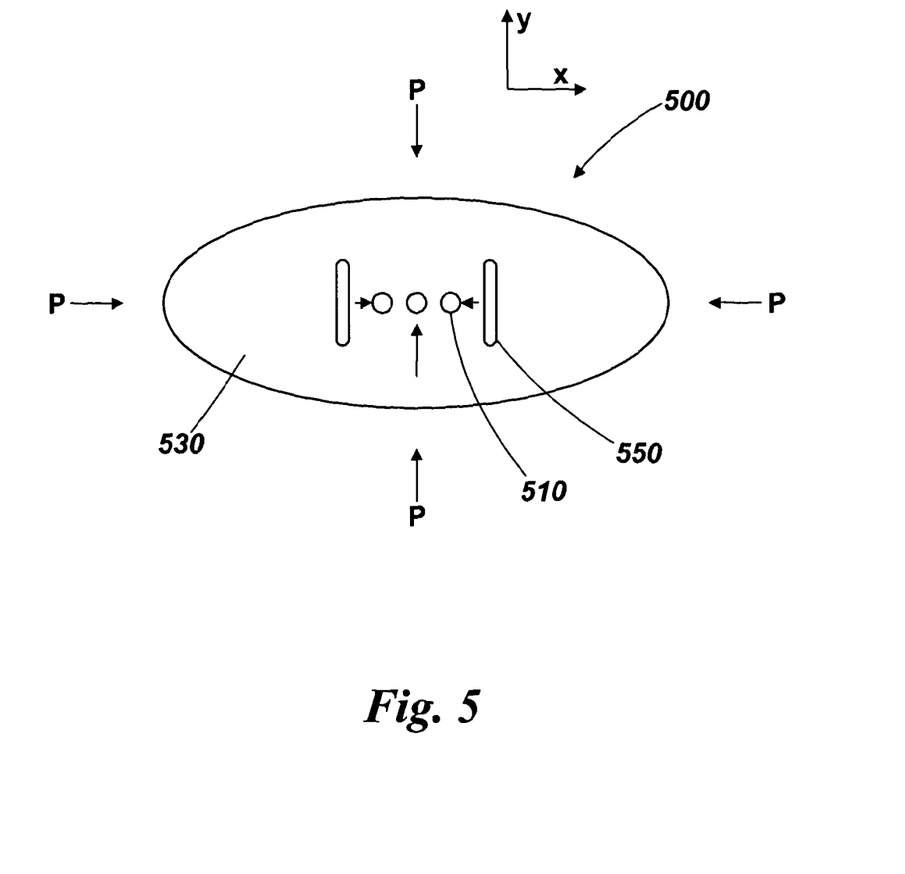
FIG. 5 is an illustration of a cross-section through an optical fibre cable embodiment having three optical fibres and two ribs.
Figure 6:
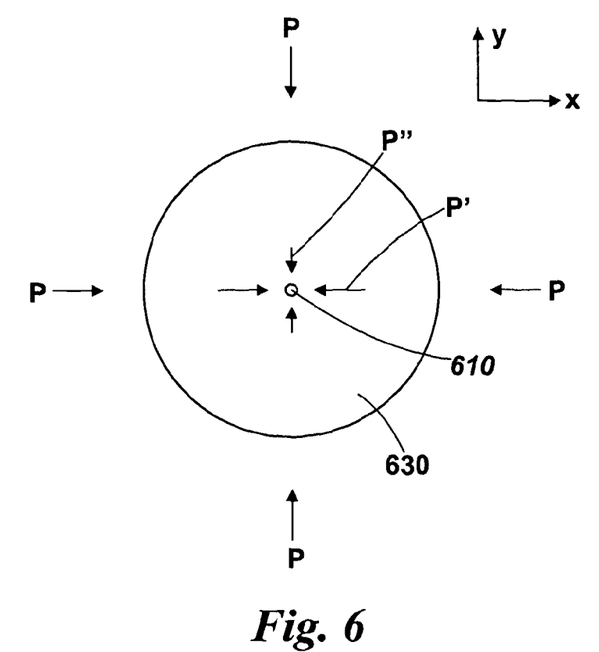
FIG. 6 is a schematic illustration of a cross-section of an optical fibre cable embodiment having a buffer made from a material exhibiting anisotropic compressibility.
Figure 7:
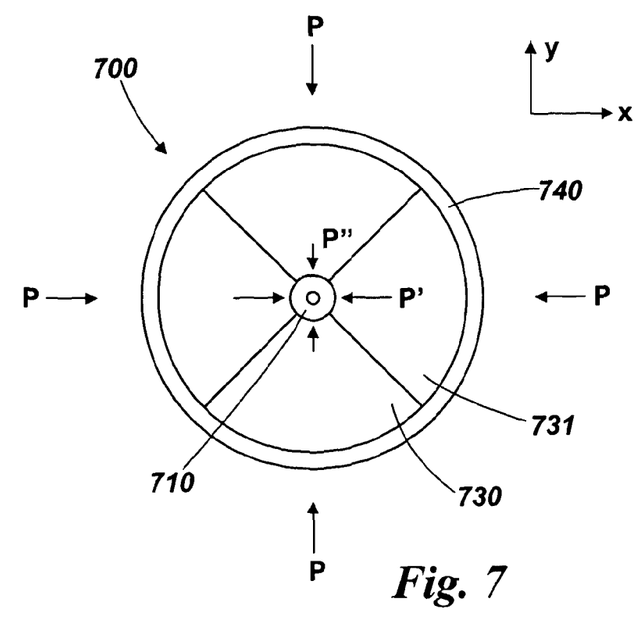
FIG. 7 is a schematic cross-sectional illustration through an optical fibre cable in which the buffer is divided into quadrants and made from two materials.

FIGS. 5, 6 and 7 show alternative embodiments of optical fibre cable. Each can be adapted to have a single fibre or core, or multiple fibre or cores. Preferably the cable uses standard single mode fibre which is easily and cheaply available rather than specialist fibres which are more costly.

FIG. 5 shows an optical fibre cable 500 comprising three optical fibres 510 such as three single mode optical fibres. These three fibres are arranged in a line. To the side of the first and third fibre is a rib 550. The fibres 510 and ribs 550 are formed in buffer 530. The buffer may be a polymer and ribs may be a more rigid material, i.e. one having a greater value for Young's modulus. For example, the ribs may be a metal. The oval outer shape of the buffer layer 530 in combination with the ribs 550 provide an asymmetric stress distribution throughout the buffer such that the stresses induced in the optical fibres are different in the x and y directions as shown in FIG. 5. The use of ribs 550 also allows the outer shape of the buffer to have other forms such that even if the buffer has a circular outer shape the induced stress in the fibres will be different in the x and y directions.

FIG. 6 shows a transverse cross-section through another embodiment. In this embodiment different resulting stresses and hence a change in birefringence is caused by the material used for the buffer 630 rather than the external shape of the buffer. The material for the buffer 630 has a property that it behaves anisotropically under applied stress. As shown in FIG. 6 fluid pressure P acts isotropically on the cable such that pressure P is exerted at all points on the surface of the cable.

The buffer material is anisotropic in that it deforms more readily in the x direction than the y direction. Hence, the pressure P' acting on the core 610 of the fibre in the x direction is greater than the pressure P" acting on the core 610 of fibre in the y direction. Certain crystalline materials possess the stress anisotropy described above, as do more complex materials or materials that have been treated or hardened using particular methods. The structure of FIG. 6 is advantageous in that the outer shape of the cable may be circular. As for other embodiments described herein the fibre may be a standard single mode fibre and multiple fibres may be included in the buffer.

FIG. 7 shows a variation of some of the earlier embodiments in that the relative stiffness of the buffer is different in orthogonal directions x and y. In this embodiment the optical fibre cable 700 is formed with an optical fibre 710 surrounded by a two-material buffer. The buffer is divided into four quadrants, each making an angle of around 90° with the fibre axis. Opposing quadrants 730 are formed of a first material and other opposing quadrants 731 are formed of a second material. The quadrants are surrounded by a jacket 740 which holds the parts of the cable together. The two materials for the quadrants are chosen because they behave differently under an applied pressure. For example, first material 730 may be more compressible than second material 731 such that some of the pressure P acting on the jacket is not transferred to the fibre 710 because first material is compressed by the pressure. Second material is less compressible and hence applied fluid pressure P is transferred to the fibre 710 as pressure P'.

Figure 8:
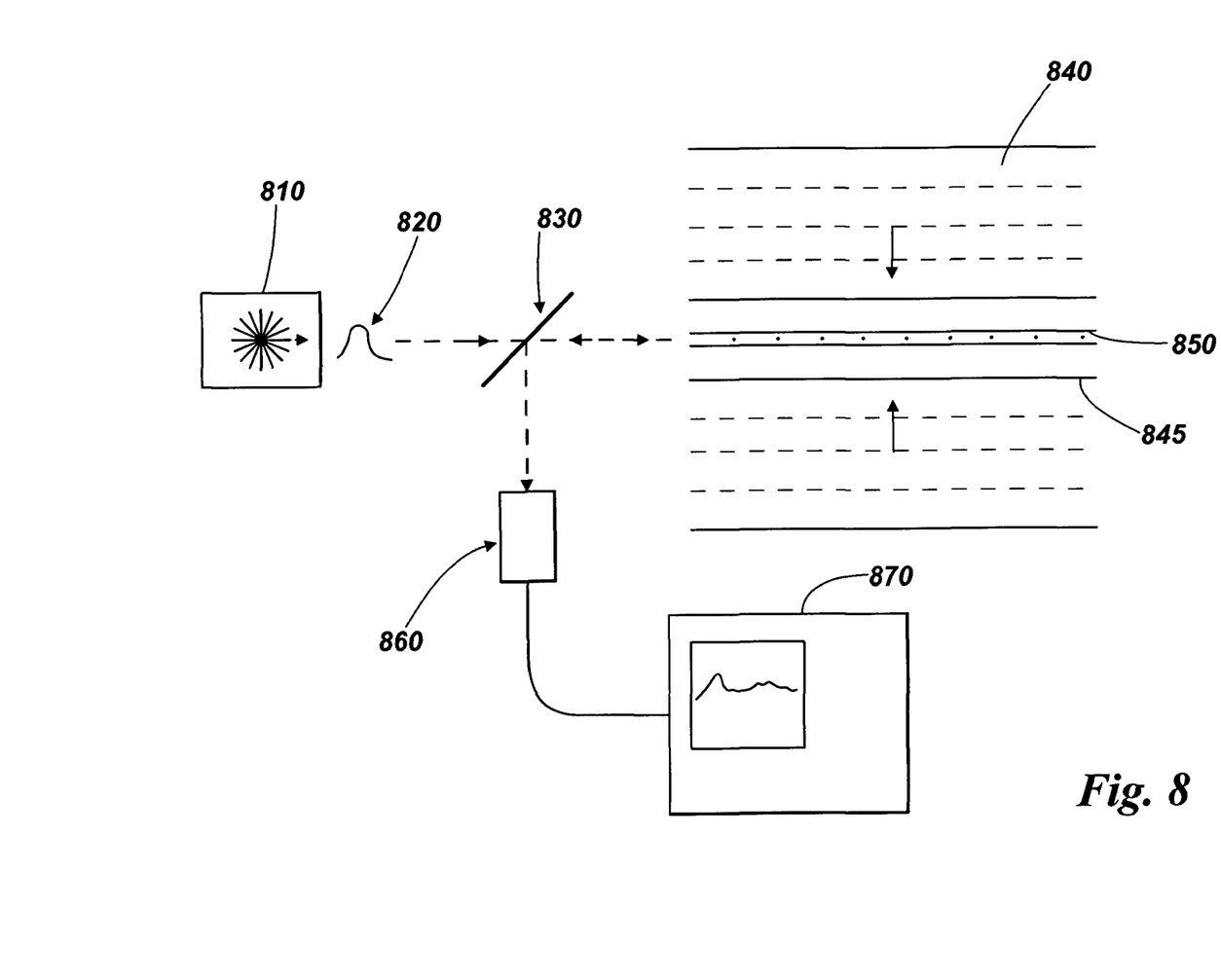
FIG. 8 is schematic diagram of an apparatus for measuring pressure in fluids and comprising an optical fibre cable according to the present invention.

FIG. 8 is a schematic illustration of an apparatus, including the optical fibre cable described above, for measuring the pressure in a fluid in which the optical fibre cable is located.

The apparatus comprises a light source 810 arranged to provide optical pulses 820. A beamsplitter or light divider 830 arranged to transmit light pulses 820 to optical fibre 850 of optical fibre cable 845. The optical fibre cable 845 is inserted or located into a fluid 840 such as found in a pipeline, well, bore etc. Light pulses 820 launched into fibre 850 are Rayleigh backscattered within the fibre. The backscattered pulses are transmitted back up the fibre towards launch end and are reflected by beamsplitter or light divider 830 towards detector 860. The detector converts the backscattered optical pulses into one or more time varying electrical signals. The electrical signals are processed by analyser 860 and converted to a pressure measurement along the fibre.

The optical fibre is preferably a standard single mode optical fibre but may be other types of fibre. Birefringence is defined as the difference in refractive index for two orthogonally polarised rays. Thus, birefringence is normally denoted by $$b = n_e - n_o$$

where $n_e$ and $n_o$ are the refractive indices for the two rays: the ordinary and extraordinary rays which respectively lie perpendicular and parallel to the axis of anisotropy.

The optical pulses 820 are preferably linearly polarised. Circularly polarised light may alternatively be used. Preferably the light source is arranged to launch pulses in two linear polarisation states separated by 45°. For example, a first linearly polarised pulse may be launched into the fibre, and the backscattered signal is detected. Subsequently, further pulses may be launched into the fibre. Preferably, linearly polarised pulses are launched polarised at 45° and 90° (and even 135°) to the first pulse. Pulses at 45° can be used to reduce the effects of polarisation fading. This occurs as a result of an accidental alignment between the polarisation state of the light and one of the eigenmodes of the fibre in a region of the fibre, such that no information on birefringence can be determined. Optionally, pulses at 90° can also be used to reduce the effects of polarisation dependent loss (PDL). As the pulses travel along the fibre pressure variations in the fluid will change the birefringence of the fibre. Rayleigh scattering centres within the fibre will causes a small fraction of the light pulses to be backscattered. The Rayleigh scattering centres are inhomogeneities in the fibre and result in a backscatter signal which is continuous but varying in amplitude and phase. The incident signal and backscatter signal are subject to the variations in birefringence inherent in the fibre and caused by the external pressure. Variations in the birefringence with time at a particular location along the fibre and hence fluid path, e.g. oil well, pipeline, provide information on events occurring at that location. Thus changes in the backscatter signal for a given return path travel time are monitored.

It is also possible to obtain an absolute or calibrated measure of pressure, the fibre backscatter signal may be compared with a measurement of the optical fibre cable made at at least one known pressure, such as atmospheric pressure.

The detector and analyser together perform the function of a polarisation analyser. The polarisation analyser determines the linear retardance of the backscattered light along the fibre. This may be achieved by performing a full Stokes analysis. However, such detailed analysis is not necessary in the absence of circular birefringence and may be too complex to allow the polarisation measurement to be carried out time-continuously for all of the backscattered light from a pulse. Hence, the polarisation analyser may perform a simpler measurement such as measuring the power in orthogonal or 45° offset polarisation states.

The resulting measurement of the linear retardance will provide a spatial variation in the linear birefringence along the length of the fibre. A calibration backscatter signal at a known pressure can be used in the calculation of the sensed pressure. Preferably, a second calibration or backscatter signal at another pressure has also been determined. The calibration pressures are preferably at the two extremes of the pressure range expected to be sensed by the fibre cable. The sensed backscatter signal can be converted to a pressure distribution by interpolating between the known pressures. Alternatively, if the performance of the fibre cable is known, i.e. there is numerical understanding of how the pressure deforms the fibre and the resulting changes in birefringence, then the analyser can include such a numerical model and use it with the polarimetric backscatter data to calculate the pressure distribution along the cable. Preferably the analyser displays the pressure distribution on a screen, but optionally the polarimetric backscatter data may also be displayed.

In embodiments where the fibre cable comprises one or more optical fibres, optical pulses may be launched into each of the fibres. A multiple-fibre cable has a structure in which each fibre will be affected differently by the fluid pressure and resultant compressive strain, such that the change in birefringence for each fibre is different. When the magnitude of the deformation or change in birefringence is significantly different (e.g. 10× or 100×) then these fibres can be used for measuring the pressure at different pressure ranges, as discussed above. Thus, light pulses can be launched into all fibres or just the appropriate fibre for the expected pressure range. Where there is symmetry in the cable such that two fibres experience substantially similar deformation and birefringence, both fibres can be interrogated to provide a pressure measurement with improved accuracy.

The person skilled in the art will readily appreciate that various modifications and alterations may be made to the above described cable, methods and apparatus without departing from the scope of the appended claims. For example, different materials, dimensions and shapes of buffer may be used. Techniques other than polarimetry may be used to measure the changing birefringence of the fibre. For example, interferometric techniques may be used depending on the type of fibre.

The invention claimed is:

1. An apparatus for detecting changes in a pressure distribution along an extended fluid path, the apparatus comprising:
   an optical fibre cable for distributed pressure sensing, comprising: one or more optical fibres; and a buffer surrounding the one or more optical fibres and adapted to deform asymmetrically under isotropic pressure such that the fibre experiences asymmetric strain, which changes the birefringence of the one or more optical fibres in response to changes in the isotropic pressure;
   a light source arranged to launch optical pulses into the one or more optical fibres of the optical fibre cable;
   a detector for detecting light backscattered from within the one or more optical fibres of the optical fibre cable; and
   an analyser arranged to detect said changes in the pressure distribution along a length of the fibre cable from the detected backscattered light,
   wherein the detector comprises a polarisation detector arranged to detect polarisation states of the backscattered light.

2. The apparatus of claim 1, wherein the buffer of the optical fibre cable has an orthogonally asymmetric cross-section transverse to the axes of the one or more optical fibres.

3. The apparatus of claim 1, wherein the buffer of the optical fibre cable has orthogonally asymmetric compressibility transverse to the axes of the one or more optical fibres.

4. The apparatus of claim 2, wherein planes of orthogonal asymmetry of the buffer of the optical fibre cable coincide with the fast and slow axes of the one or more optical fibres.

5. The apparatus of claim 1, wherein the one or more optical fibres are single mode fibres having a core and cladding.

6. The apparatus of claim 4, wherein the buffer material is anisotropic such that it deforms different amounts in orthogonal directions under isotropic pressure and is arranged such that the one or more optical fibres experience asymmetric strain changing the birefringence of the one or more optical fibres.

7. The apparatus of claim 1, wherein the buffer surrounds the one or more optical fibres and has a radial thickness which varies with orthogonal symmetry.

8. The apparatus of claim 7, wherein the buffer has one or more longitudinal regions of a first thickness and one or more longitudinal regions of a second thickness greater than the first thickness.

9. The apparatus of claim 8, wherein the longitudinal regions of a first thickness are arranged to deform more than the regions of a second thickness when an isotropic pressure is exerted on the cable.

10. The apparatus of claim 1, wherein the optical fibre cable further comprises a pair of ribs arranged in the buffer on a diameter of the cable.

11. The apparatus of claim 10, wherein the ribs are less compressible than the buffer such that the fibre experiences asymmetric strain when the cable is under isotropic pressure.

12. The apparatus of claim 1, wherein the optical fibre cable comprises a plurality of optical fibres arranged linearly in the buffer.

13. The apparatus of claim 1, wherein the buffer of the optical fibre cable is elliptical or oval.

14. The apparatus of claim 1, wherein the analyser detects said changes in pressure distribution along the fibre from the detected polarisation states.

15. The apparatus of claim 1, wherein the analyser comprises a memory for storing birefringence calibration data for at least one of the optical fibres of the optical fibre cable at a first pressure.

16. The apparatus of claim 15, wherein the memory is arranged to store birefringence calibration data for at least one of the optical fibres of the optical fibre cable at a second pressure higher than the first, and the analyser is arranged to interpolate to determine the pressure distribution in the fluid.

17. The apparatus of claim 1, wherein the light source is arranged to launch linearly or circularly polarised pulses.

18. The apparatus of claim 1, wherein the light source is arranged to launch first linearly polarised pulses and second linearly polarised pulses, the plane of polarisation of the first and second pulses being separated by approximately 45°.

19. A distributed fibre optic sensing method for determining a pressure distribution in a fluid, the method using an optical fibre cable as a sensor optical fibre cable, said optical fibre cable comprising: one or more optical fibres; and a buffer surrounding the one or more optical fibres and adapted to deform asymmetrically under isotropic pressure such that the fibre experiences asymmetric strain, which changes the birefringence of the one or more optical fibres in response to changes in the isotropic pressure, the method comprising:
   launching optical pulses into one or more optical fibres of the sensor optical fibre cable;
   detecting light backscattered from within the one or more optical fibres of the sensor optical fibre cable; and
   calculating a function of the pressure in the fluid, as a distribution along a length of the fibre, from the detected backscattered light from the one or more optical fibres,
   wherein the step of detecting comprises detecting polarisation states of the backscattered light.

20. The method of claim 19, wherein the step of calculating comprises deriving a pressure distribution along the fibre from the detected polarisation states.

21. The method of claim 19, further comprising storing birefringence calibration data for at least one of the optical fibres of the optical fibre cable at a first pressure.

22. The method of claim 21, further comprising storing birefringence calibration data for at least one of the optical fibres of the optical fibre cable at a second pressure higher than the first; and
   interpolating to determine the sensed pressure distribution in the fluid.

23. The method of claim 19, wherein the optical pulses are linearly or circularly polarised pulses.

24. The method of claim 19, wherein the optical pulses comprise first linearly polarised optical pulses and second linearly polarised optical pulses, the plane of polarisation of the first and second pulses being separated by 45°.

25. The method of claim 19, further comprising deploying the optical fibre cable in an extended fluid path.

26. An apparatus for detecting changes in a pressure distribution along an extended fluid path, the apparatus comprising:
   an optical fibre cable for distributed pressure sensing, comprising: one or more optical fibre cores; a cladding surrounding the one or more optical fibre cores, the cladding having an elliptical or oval cross-section transverse to the fibre axis, wherein the cladding is adapted to deform asymmetrically under isotropic pressure such that the cores experience asymmetric strain changing the birefringence of the one or more optical fibre cores;

a light source arranged to launch optical pulses into the one or more optical fibres of the optical fibre cable;

a detector for detecting light backscattered from within the one or more optical fibres of the optical fibre cable; and an analyser arranged to detect said changes in the pressure distribution along a length of the fibre cable from the detected backscattered light, wherein the detector comprises a polarisation detector arranged to detect polarisation states of the backscattered light.

27. The apparatus of claim 26, wherein the optical fibre cable further comprises a buffer surrounding the cladding, the buffer having an elliptical or oval cross-section transverse to the fibre axis.

28. The apparatus of claim 27, wherein the buffer is adapted to deform asymmetrically under isotropic pressure such that the fibre cores experience asymmetric strain changing the birefringence of the one or more optical fibre cores.

* * * * *